United States Patent
Jiang et al.

(10) Patent No.: US 12,402,727 B2
(45) Date of Patent: Sep. 2, 2025

(54) MULTILAYER BLOW MOLDED BOARD AND ITS COMPOSITION

(71) Applicant: THREE STONE, LLC., San Jose, CA (US)

(72) Inventors: Yixiang Jiang, Yuyao (CN); Jinglei Jiang, Yuyao (CN)

(73) Assignee: THREE STONE, LLC., San Jose, CA (US)

( * ) Notice: Subject to any disclaimer, the term of this patent is extended or adjusted under 35 U.S.C. 154(b) by 0 days.

(21) Appl. No.: 16/670,986

(22) Filed: Oct. 31, 2019

(65) Prior Publication Data
US 2021/0022502 A1    Jan. 28, 2021

(30) Foreign Application Priority Data
Jul. 25, 2019 (CN) .......................... 201910678593.X

(51) Int. Cl.
*B32B 27/32* (2006.01)
*A47B 96/20* (2006.01)
(Continued)

(52) U.S. Cl.
CPC ................ *A47B 96/20* (2013.01); *B32B 3/30* (2013.01); *B32B 27/08* (2013.01); *B32B 27/20* (2013.01);
(Continued)

(58) Field of Classification Search
CPC .. B32B 27/32; B32B 7/04; B32B 7/05; B32B 2250/03; B32B 2250/242; B32B 27/08; B32B 27/327; B29K 2023/06; B29K 2023/065; B29C 49/0031; B29C 2049/0057; B29C 2049/0063;
(Continued)

(56) References Cited

U.S. PATENT DOCUMENTS 5,714,227 A * 2/1998 Sugawara ............... B29C 49/04
                                                                428/71
5,794,544 A * 8/1998 Shuert ................ B65D 19/0012
                                                            108/57.25
(Continued)

FOREIGN PATENT DOCUMENTS

CN      205849065 U  *  1/2017  ............. A47B 13/08
CN      105968508 B  *  9/2018  ............. A47B 13/08
(Continued)

*Primary Examiner* — Michael C Romanowski
(74) *Attorney, Agent, or Firm* — David & Raymond Patent Firm; Raymond Y Chan

(57) ABSTRACT

A multilayer blow-molded board comprises an upper layer board and a lower layer board to form a hollow structure. Each of the layer boards comprises an outer layer and an inner layer. The present disclosure has the following advantages: the lower layer board is recessed upward so that the inner layers of the board and the upper layer board fuse with each other to form a supporting contact structure, resulting in enhanced structure strength. Furthermore, the outer layer of the board can utilize a strong surface-strength material whereas the inner layer can utilize a low thermoplastic-shrinkage-rate material to provide a frame support. In addition, a tough and flexible material is adopted for the intermediate layer to improve the overall structural strength of the blow-molded board.

18 Claims, 4 Drawing Sheets

(51) Int. Cl.
*B32B 3/30* (2006.01)
*B32B 27/08* (2006.01)
*B32B 27/20* (2006.01)

(52) U.S. Cl.
CPC ............ *B32B 27/32* (2013.01); *B32B 27/327* (2013.01); *B32B 2250/242* (2013.01); *B32B 2262/101* (2013.01); *B32B 2264/10* (2013.01); *B32B 2479/00* (2013.01)

(58) Field of Classification Search
CPC ... B29C 48/0017; B29C 49/22; B29C 48/022; B29D 24/001; B29D 24/002; B29D 24/004; B29D 24/005; B29D 24/007; B29D 24/008; A47B 13/08–16; A47B 96/20; A47B 96/206; B29L 2007/002; B29L 2031/441; B29L 2031/448
USPC .............................................. 428/34.1–36.92
See application file for complete search history.

(56) References Cited

U.S. PATENT DOCUMENTS

| | | | |
|---|---|---|---|
| 2005/0160950 A1* | 7/2005 | Haney | A47B 13/08 108/129 |
| 2007/0100054 A1* | 5/2007 | Uosaki | B29C 49/0005 524/487 |
| 2008/0008861 A1* | 1/2008 | Leng | B32B 27/08 264/319 |
| 2009/0000528 A1* | 1/2009 | Leng | A47B 13/003 108/156 |
| 2009/0148668 A1* | 6/2009 | Leng | A47C 5/12 428/172 |
| 2010/0080924 A1* | 4/2010 | Leng | B32B 27/365 427/493 |
| 2011/0303355 A1* | 12/2011 | Sumi | B29C 51/267 156/245 |
| 2012/0100356 A1* | 4/2012 | Ohlsson | B32B 27/32 428/213 |
| 2016/0270521 A1* | 9/2016 | Jiang | A47B 3/08 |
| 2016/0325486 A1* | 11/2016 | McLeod | B29B 11/10 |
| 2017/0182697 A1* | 6/2017 | Lemay | B29C 51/14 |
| 2018/0071969 A1* | 3/2018 | Anderson | B29B 17/0005 |

FOREIGN PATENT DOCUMENTS

| | | | | |
|---|---|---|---|---|
| JP | H11207807 | * | 8/1999 | ............ B29C 49/04 |
| JP | 2001179805 A | * | 7/2001 | ......... B29C 47/0026 |

* cited by examiner

MULTILAYER BLOW MOLDED BOARD AND ITS COMPOSITION

RELATED APPLICATIONS

This application claims priorities to Chinese patent application No. 201910678593.X, filed Jul. 25, 2019, entitled "MULTILAYER BLOW-MOLDED BOARD AND ITS COMPOSITION", and Chinese patent application No. 201921185624.X, filed Jul. 25, 2019, entitled "MULTI-LAYER BLOW-MOLDED BOARD" disclosure of which is hereby incorporated herein by reference in its entirety for all purposes.

FIELD OF THE INVENTION

The present disclosure is directed to a molded board, in particular to a multilayer blow-molded board and its composition.

BACKGROUND

At present, blow-molded boards have been widely used in various furniture products. The blow-molded board generally comprises an upper layer board and a lower layer board that form a hollow structure between the two layers. Since the body has a hollow structure, the biggest advantage of the blow-molded board over the injection-molded board is that it uses less material, resulting in lower cost. Moreover, the blow-molded board can also effectively achieve structural strength. In today's market, most of the upper and lower layer boards have single-layer structures that are not only mediocre in the structure but also lead to poor impact resistance, which can be easily deformed under external force. It reduces the service life of the blow-molded board. In summary, the structure of the present blow-molded board needs to be improved.

SUMMARY OF THE INVENTION

The first technical problem solved by the present disclosure is to provide a multilayer blow-molded board with excellent impact resistance and structural stability in view of the above state of the art.

The second technical problem solved by the present disclosure is to provide a composition of a double-layer blow-molded board with excellent impact resistance and structural stability in view of the above state of the art.

The third technical problem solved by the present disclosure is to provide a composition capable of being made into a three-layer blow-molded board with excellent impact resistance and structural stability in view of the above state of the art.

The present disclosure's technical solution for the first technical problem is: the multilayer blow-molded board comprises an upper layer board and a lower layer board that are blow-molded to form a hollow structure. According to some embodiments, each of the upper layer board and the lower layer board comprises an outer layer and an inner layer, and the lower layer board is recessed upward so that the inner layers of the lower layer board and the upper layer board fuse with each other to form a supporting contact structure.

Preferably, according to some embodiments, each of the upper layer board and the lower layer board comprises an outer layer, an intermediate layer and an inner layer. The lower layer board is recessed upward so that the inner layers of the lower layer board and the upper layer board fuse with each other to form a supporting contact structure.

In order to increase the edge structural strength of the blow-molded board, the outer edge of the upper layer board has an outer bent wall that is bent downward, the outer edge of the lower layer board has an inner bent wall that is bent downward. The inner layer of the outer bent wall fuses with the inner layer of the inner bent wall at the bottom.

In order to improve the structural strength of the blow-molded board, the supporting contact structure is strip shaped, and at least one reinforcing rib is disposed in the supporting contact structure.

Further preferably, according to some embodiments, the supporting contact-structure is provided with two reinforcing ribs. Accordingly, three contact areas are arranged in the supporting t contact structure and are arranged at intervals from the reinforcing ribs. Accordingly, the supporting contact structure is provided with three contact areas that are spaced apart between the reinforcing ribs.

The present disclosure's technical solution to the above second technical problem is related to the composition of a double-layer blow-molded board: the outer layers of the upper layer board and the lower layer board comprise high-density polyethylene, whereas the inner layers of the upper layer board and the lower layer board comprise a mixture of high-density polyethylene, metallocene polyethylene and calcium carbonate, or in the alternative, a mixture of high-density polyethylene, metallocene polyethylene and glass fiber.

Preferably, according to some embodiments, the mass percentage of the metallocene polyethylene in the inner layers ranges between 10-15%, the calcium carbonate ranges between 15-20%, and the remaining is high-density polyethylene; in the alternative, the mass percentage of metallocene polyethylene in the inner layer ranges between 10~15%, the glass fiber ranges between 15~25%, and the remaining is high-density polyethylene.

The present disclosure's technical solution to the above third technical problem is related to the composition of a three-layer blow-molded board: the outer layers of the upper layer board and the lower layer board comprise high-density polyethylene, the intermediate layer comprise a mixture of high-density polyethylene and calcium carbonate or a mixture of high-density polyethylene and glass fiber, and the inner layer comprise metallocene polyethylene.

As a preferred embodiment of the intermediate layer, the mass percentage of high-density polyethylene in the intermediate layer ranges between 70-85%, and the calcium carbonate ranges between 15-30%.

As another preferred embodiment of the intermediate layer, the mass percentage of high-density polyethylene in the intermediate layer ranges between 60-85%, and the glass fiber ranges between 15-40%.

Compared with the prior art, the present disclosure has the following advantages: the lower layer board of the multilayer blow-molded board is recessed upward so that the inner layers of the lower layer board and the upper layer board fuse with each other to form a supporting contact structure, resulting in enhanced structure strength; the outer layer of the board can utilize a strong surface-strength material that is scratch resistant and oil resistant, whereas the inner layer can utilize a low thermoplastic-shrinkage-rate material to provide a frame support; when a tough, flexible and energy-absorbing material is adopted for the intermediate layer, it can further effectively mitigate impact damage to the board, thereby improving the overall structural strength of the blow-molded board.

DETAILED DESCRIPTION OF EMBODIMENTS

The present disclosure is described in further detail below with reference to the embodiments of the accompanying drawings.

Embodiment I

Figure 1:
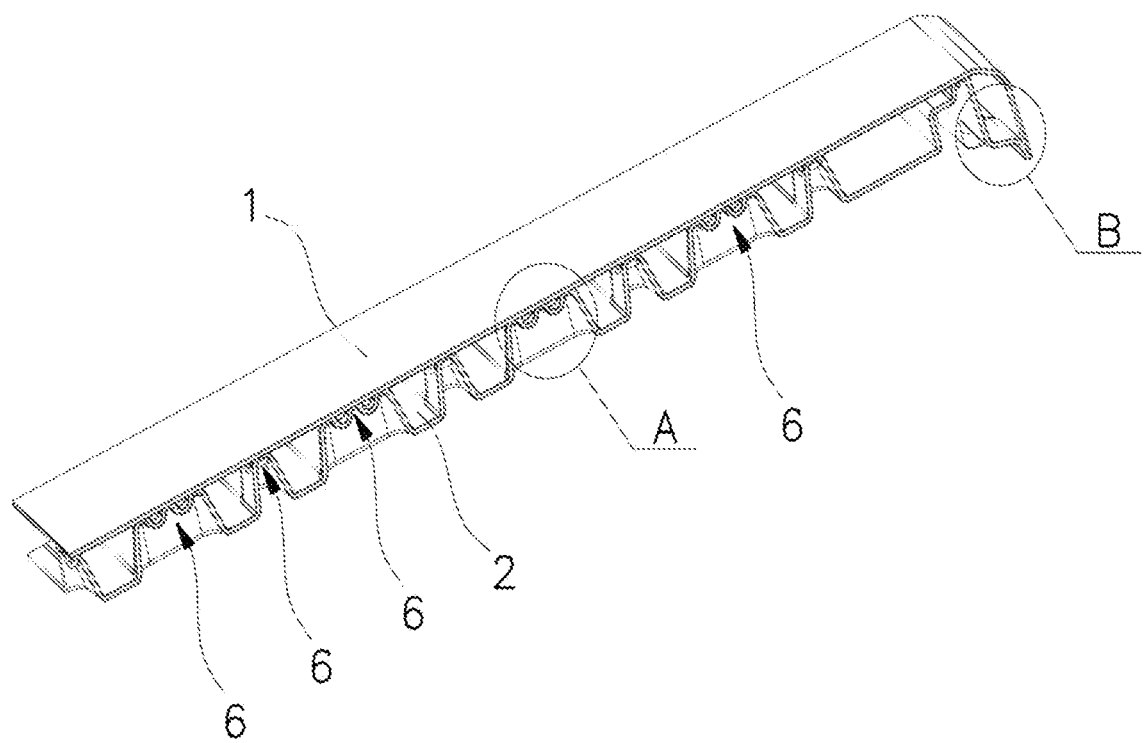
FIG. 1 is a schematic structural view of Embodiment I of the present disclosure.
Figure 2:
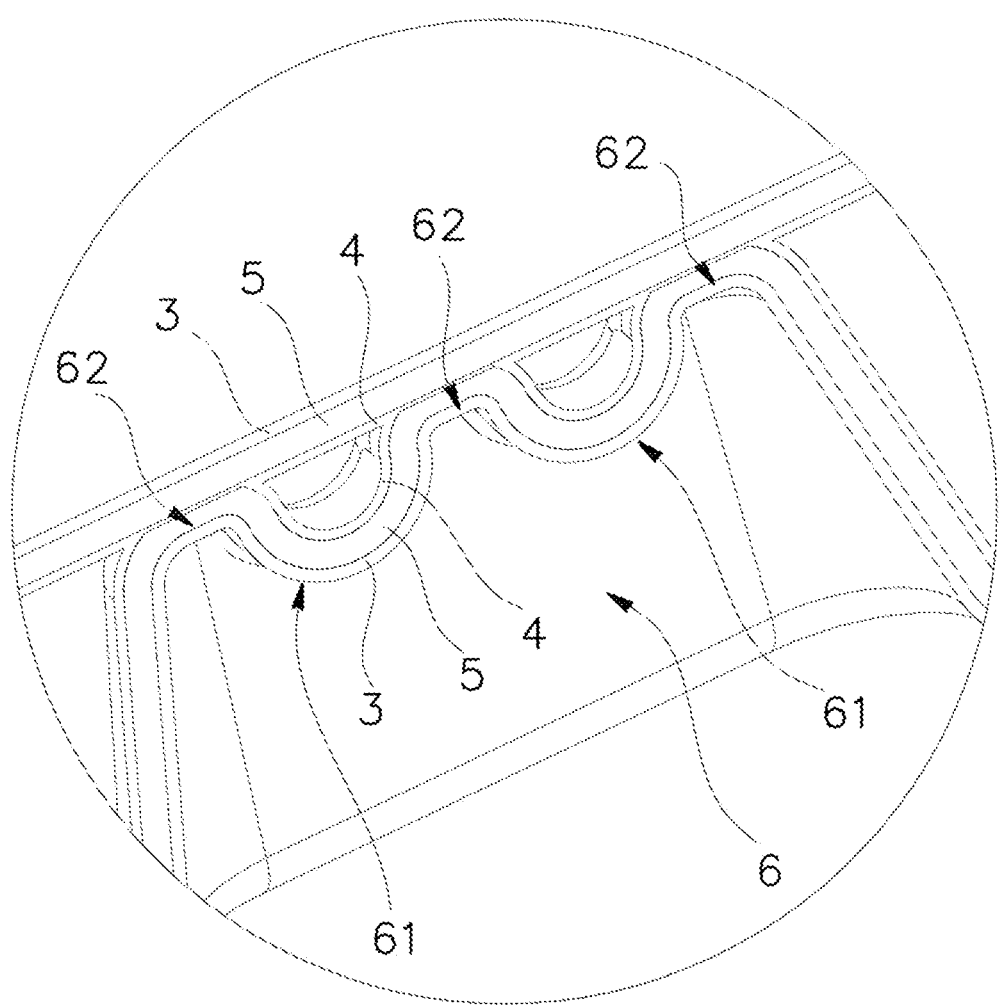
FIG. 2 is an enlarged schematic view of a portion A of FIG. 1.
Figure 3:
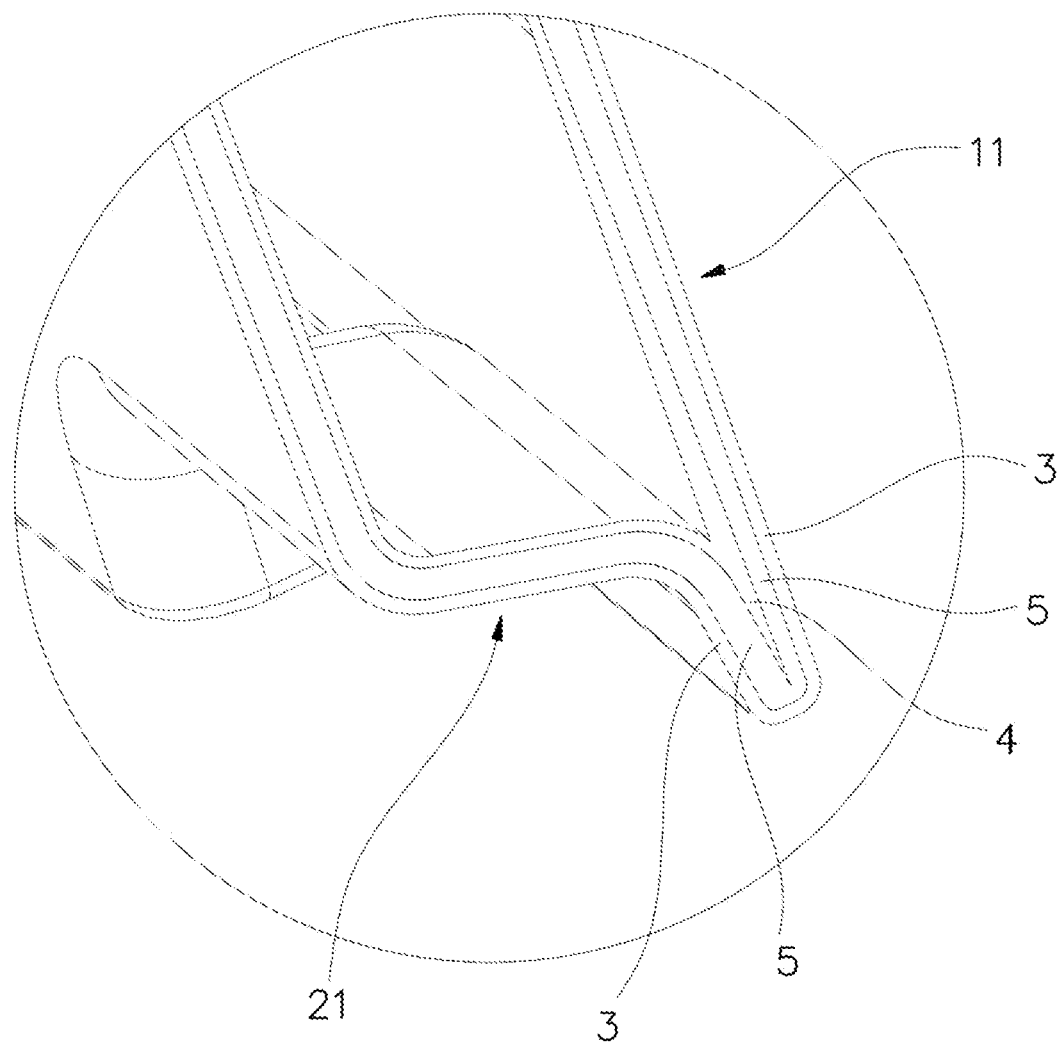
FIG. 3 is an enlarged schematic view of a portion B of FIG. 2.

As shown in FIG. 1 to FIG. 3, the multilayer blow-molded board of the present embodiment comprises an upper layer board 1 and a lower layer board 2, and the two boards are blow molded to form a hollow structure between them.

In the present embodiment, both of the upper layer board 1 and the lower layer board 2 have a three-layer structure, that is, each board includes an outer layer 3, an intermediate layer 5 and an inner layer 4. Moreover, the lower layer board 2 is recessed upward so that the inner layers 4 of the lower layer board and the upper layer board fuse with each other to form a supporting contact structure 6.

The edge structure of the board is as follows: the outer edge of the upper layer board 1 has an outer bent wall 11 that is bent downward, and the outer edge of the lower layer board 2 has an inner bent wall 21 that is bent downward. The inner layer 4 of the outer bent wall 11 fuses with the inner layer 4 of the inner bent wall 21 at the bottom.

In the present embodiment, the supporting contact structure 6 is strip shaped and is provided with two reinforcing ribs 61. Accordingly, the two reinforcing ribs 61 are spaced apart by three contact areas 62.

In the present embodiment, the composition of the three-layer board is as follows: the outer layers 3 of the upper layer board 1 and the lower layer board 2 comprise high-density polyethylene, the intermediate layers 5 of the upper layer board 1 and the lower layer board 2 comprise either a mixture of high-density polyethylene and calcium carbonate or a mixture of high-density polyethylene and glass fiber, and the inner layers 4 of the upper layer board 1 and the lower layer board 2 comprise metallocene polyethylene.

As such, the outer layers 3 have the advantages of high surface strength, strong scratch resistance and oil/stain resistance, the inner layers 4 have a low thermoplastic shrinkage rate for providing frame support, and the intermediate layers 5, being tough, flexible and energy absorbing, can effectively mitigate impact and drop damage to the board.

When the intermediate layer 5 comprises a mixture of high-density polyethylene and calcium carbonate, the mass percentage of the polyethylene ranges between 70-85%, and the calcium carbonate ranges between 15-30%.

When the intermediate layer 5 comprises a mixture of high-density polyethylene and glass fiber, the mass percentage of the polyethylene ranges between 60-85%, and the glass fiber ranges between 15-40%.

In the present embodiments, with both the upper layer board 1 and the lower layer board 2 adopting the aforementioned three-layer structure, when the outer layer 3 is subject to strong impact, the inner layer 4 can proactively crack to absorb the impact energy. As the material of the intermediate layer 5 is resilient, it can reset the inner layer 4 to ensure the integrity and function of the overall board. Thus, the multilayer board has advantages including strong surface strength, an even surface, high deformation resistance, a stable structure, high performance, and long service life.

The multilayer blow-molded board can have a variety of different applications, such as in tables, chairs, table surfaces, and chair backboards, etc. It can be used in other products that are prone to broken surface boards, or in the alternative, used as building materials for heat insulation.

The high-density polyethylene in the outer layer 3 has the following parameters: flow speed: 1.5 g/10 min, bending strength: 900 MPa, Shore D hardness: D69.

The high-density polyethylene in the intermediate layer 5 has the following parameters: flow speed: 0.35 g/10 min, bending strength: 1050 MPa, Shore D hardness: D63.

The metallocene polyethylene in the inner layer 4 has the following parameters:

flow speed: 2.0 g/10 min;
Break elongation: 420% in the longitudinal direction and 830% in the transverse direction;
Tensile strength. 62 MPa in the longitudinal direction and 25 MPa in the lateral direction;
Dart impact strength<48 g; and
Elmendorf tear strength: 21° C. in the longitudinal direction and 430° C. in the lateral direction.

In a simplified embodiment, the outer layer, the intermediate layer and the inner layer can comprise either the same material or the same material with different brands and grades, such as high-density polyethylene. In addition, the outer layer can comprise a harder material or a colorful new material, whereas the intermediate layer can comprise a mixed material, and the inner layer can use a recycled material mixed with a proportion of structural filling material. As such, it saves manufacturing costs and enables quick color change of the board.

Embodiment II

Figure 4:
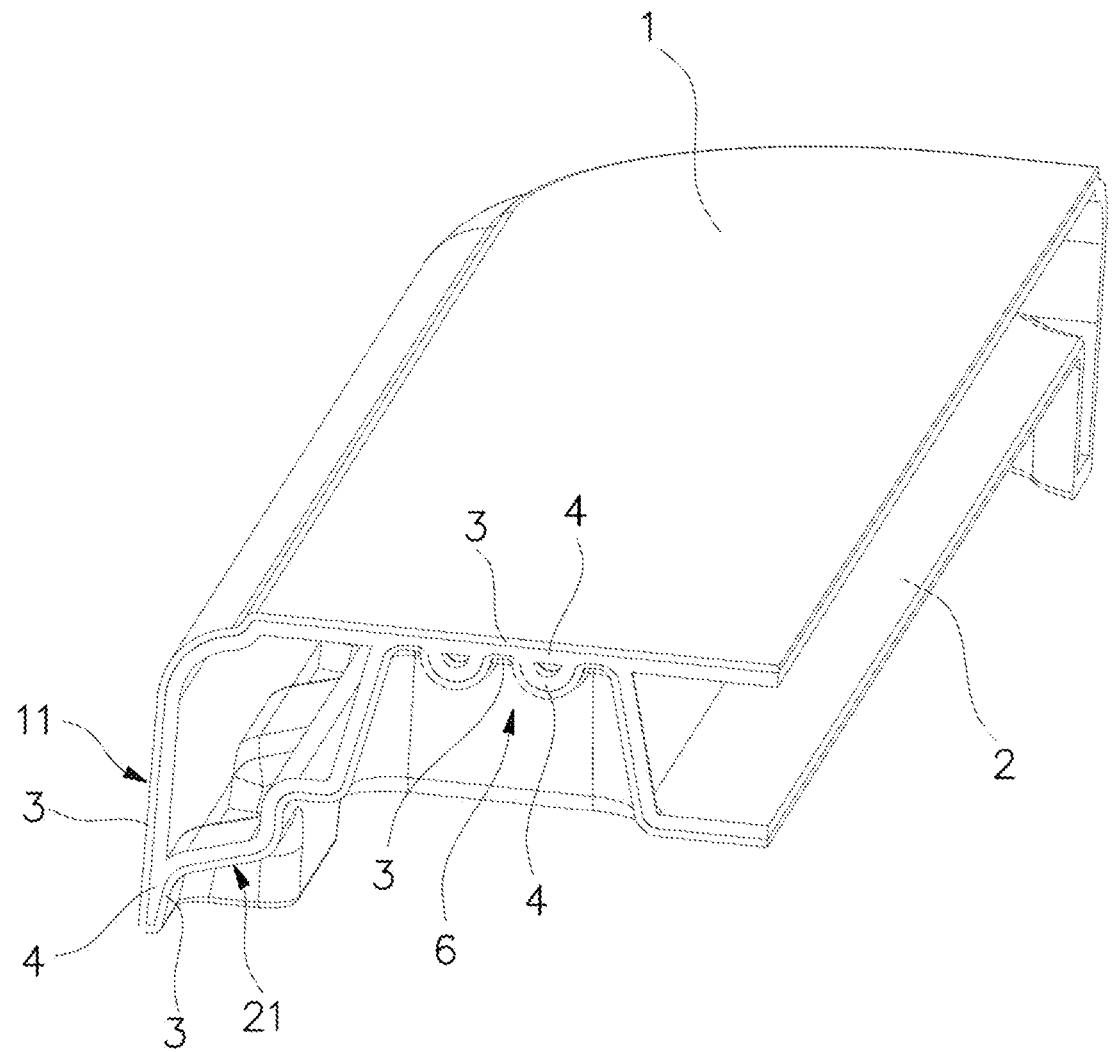
FIG. 4 is a schematic structural diagram of Embodiment II of the present disclosure.

As shown in FIG. 4, according to the present embodiment, both of the upper layer board 1 and the lower layer board 2 have a double-layer structure, that is, both boards have the outer layer 3 and the inner layer 4. Furthermore, the lower layer board 2 is recessed upward so that the inner layers 4 of the lower layer board 2 and the upper layer board 1 fuse with each other to form a supporting contact structure 6.

The double-layer blow-molded board has the following composition: the outer layers 3 of the upper layer board 1 and the lower layer board 2 comprise high-density polyethylene, and the inner layers 4 of the upper layer board 1 and the lower layer board 2 comprise a mixture of high-density polyethylene, metallocene polyethylene and calcium carbonate, or in the alternative, a mixture of high-density polyethylene, metallocene polyethylene and glass fiber.

The mass percentage of the metallocene polyethylene in the inner layers 4 ranges between 10-15%, the calcium carbonate ranges between 15-20%, and the rest is high-density polyethylene; in the alternative, the mass percentage of metallocene polyethylene in the inner layers 4 ranges between approximately 10-15%, the glass fiber ranges between approximately 15-25%, and the rest is high-density polyethylene.

In addition, the performance parameters of the high-density polyethylene and the metallocene polyethylene in the present embodiment can be referred to Embodiment I without additional repetition.

The embodiments described above are only some of the preferred embodiments of the present disclosure. It would be understood by a person skilled in the art that various changes and modifications can be made to the embodiments described herein without departing from the scope and spirit of the present disclosure. For example, the upper layer board's or lower layer board's outer layer, intermediate layer and inner layer can adopt a structure with more than one layer. Such changes and modifications should be considered as within the protection scope claimed by the present disclosure.

What is claimed is:

1. A multilayer blow-molded board for furniture products, comprising:
    an upper layer board which includes a first outer layer, a first inner layer and a first intermediate layer formed between the first outer layer and the first inner layer; and
    a lower layer board which includes a second outer layer, a second inner layer and a second intermediate layer formed between the second outer layer and the second inner layer, the upper layer board and the lower layer board being blow-molded to define a hollow structure therebetween, wherein the lower layer board is recessed upward such that the second inner layer of the lower layer board and the first inner layer of the upper layer board fuse with each other to form a supporting contact structure, wherein a peripheral outer edge of the upper layer board having a first outer bent wall and a peripheral outer edge of the lower layer board having a second outer bent wall, such that the first inner layer of the first outer bent wall fuses with the second inner layer of the second outer bent wall, wherein the lower layer board is recessed upward to form a plurality of supporting contact structures each having a strip shape, wherein each of the first outer layer of the upper layer board and the second outer layer of the lower layer board comprises a high-density polyethylene, wherein each of the first intermediate layer of the upper layer board and the second intermediate layer of the lower layer board comprises a mixture of the high-density polyethylene having a mass percentage of 70-85% and a calcium carbonate having a mass percentage of 15-30%, wherein each of the first inner layer of the upper layer board and the second inner layer of the lower layer board comprises a metallocene polyethylene.

2. The multilayer blow-molded board, as recited in claim 1, wherein the high-density polyethylene in the first outer layer and the second outer layer has a lipolysis 1.5 g/10 min, a bending strength 900 MPa and a Shore D hardness D69.

3. The multilayer blow-molded board, as recited in claim 1, wherein the high-density polyethylene in the first intermediate layer has a lipolysis 0.35 g/10 min, a bending strength 1050 MPa and a Shore D hardness D63.

4. The multilayer blow-molded board, as recited in claim 1, wherein the metallocene polyethylene in the first inner layer and the second inner layer has a lipolysis 2.0 g/10 min, a break elongation 420% in a longitudinal direction and 830% in a transverse direction, a tensile strength 62 MPa in the longitudinal direction and 25 MPa in a lateral direction, a dart impact strength less than 48 g, and an Elmendorf tear strength 21° C. in the longitudinal direction and 430° C. in the lateral direction.

5. The multiplayer blow-molded board, as recited in claim 4, wherein the high-density polyethylene in the first outer layer and the second outer layer has the lipolysis 1.5 g/10 min, a bending strength 900 MPa and a Shore D hardness D69, wherein the high-density polyethylene in the first intermediate layer has a lipolysis 0.35 g/10 min, the bending strength 1050 MPa and the Shore D hardness D63.

6. The multilayer blow-molded board, as recited in claim 1, wherein at least one of the plurality of supporting contact structures forms three contact areas spaced apart with each other and upwardly recessed to the first inner layer of the upper layer board, and two reinforcing ribs each of which is formed between two of the three contact areas, wherein the second inner layer of the lower layer board and the first inner layer of the upper layer board fuse with each other at the three contact areas.

7. The multilayer blow-molded board, as recited in claim 5, wherein at least one of the plurality of supporting contact structures forms three contact areas spaced apart with each other and upwardly recessed to the first inner layer of the upper layer board, and two reinforcing ribs each of which is formed between two of the three contact areas, wherein the second inner layer of the lower layer board and the first inner layer of the upper layer board fuse with each other at the three contact areas.

8. The multilayer blow-molded board, as recited in claim 6, wherein the first outer bent wall of the upper layer board bends downward and the second outer bent wall of the lower layer board bends downward such that the first inner layer of the outer bent wall is fused with the second inner layer of the inner bent wall at a bottom of the multilayer blow-molded board.

9. The multilayer blow-molded board, as recited in claim 7, wherein the first outer bent wall of the upper layer board bends downward and the second outer bent wall of the lower layer board bends downward such that the first inner layer of the outer bent wall is fused with the second inner layer of the inner bent wall at a bottom of the multilayer blow-molded board.

10. A multilayer blow-molded board for furniture products, comprising:
    an upper layer board which includes a first outer layer, a first inner layer and a first intermediate layer formed between the first outer layer and the first inner layer; and
    a lower layer board which includes a second outer layer, a second inner layer and a second intermediate layer formed between the second outer layer and the second inner layer, the upper layer board and the lower layer board being blow-molded to define a hollow structure therebetween, wherein the lower layer board is recessed upward such that the second inner layer of the lower layer board and the first inner layer of the upper layer board fuse with each other to form a supporting contact structure, wherein a peripheral outer edge of the upper layer board having a first outer bent wall and a peripheral outer edge of the lower layer board having a second outer bent wall, such that the first inner layer of the first outer bent wall fuses with the second inner layer of the second outer bent wall, wherein the lower layer board is recessed upward to form a plurality of supporting contact structures each having a strip shape, wherein each of the first outer layer of the upper layer board and the second outer layer of the lower layer board comprises a high-density polyethylene, wherein each of the first intermediate layer of the upper layer board and the second intermediate layer of the lower layer board comprises a mixture of the high-density polyethylene having a mass percentage of 60-85% and a glass fiber having a mass percentage of 15-40%, wherein each of the first inner layer of the upper layer board and the second inner layer of the lower layer board comprises a metallocene polyethylene.

11. The multilayer blow-molded board, as recited in claim 10, wherein the high-density polyethylene in the first outer layer and the second outer layer has a lipolysis 1.5 g/10 min, a bending strength 900 MPa and a Shore D hardness D69.

12. The multilayer blow-molded board, as recited in claim 10, wherein the high-density polyethylene in the first intermediate layer has a lipolysis 0.35 g/10 min, a bending strength 1050 MPa and a Shore D hardness D63.

13. The multilayer blow-molded board, as recited in claim 10, wherein the metallocene polyethylene in the first inner layer and the second inner layer has a lipolysis 2.0 g/10 min, a break elongation 420% in a longitudinal direction and 830% in a transverse direction, a tensile strength 62 MPa in the longitudinal direction and 25 MPa in a lateral direction, a dart impact strength less than 48 g, and an Elmendorf tear strength 21° C. in the longitudinal direction and 430° C. in the lateral direction.

14. The multiplayer blow-molded board, as recited in claim 10, wherein the high-density polyethylene in the first outer layer and the second outer layer has the lipolysis 1.5 g/10 min, a bending strength 900 MPa and a Shore D hardness D69, wherein the high-density polyethylene in the first intermediate layer has a lipolysis 0.35 g/10 min, the bending strength 1050 MPa and the Shore D hardness D63.

15. The multilayer blow-molded board, as recited in claim 10, wherein at least one of the plurality of supporting contact structures forms three contact areas spaced apart with each other and upwardly recessed to the first inner layer of the upper layer board, and two reinforcing ribs each of which is formed between two of the three contact areas, wherein the second inner layer of the lower layer board and the first inner layer of the upper layer board fuse with each other at the three contact areas.

16. The multilayer blow-molded board, as recited in claim 14, wherein at least one of the plurality of supporting contact structures forms three contact areas spaced apart with each other and upwardly recessed to the first inner layer of the upper layer board, and two reinforcing ribs each of which is formed between two of the three contact areas, wherein the second inner layer of the lower layer board and the first inner layer of the upper layer board fuse with each other at the three contact areas.

17. The multilayer blow-molded board, as recited in claim 15, wherein the first outer bent wall of the upper layer board bends downward and the second outer bent wall of the lower layer board bends downward such that the first inner layer of the outer bent wall is fused with the second inner layer of the inner bent wall at a bottom of the multilayer blow-molded board.

18. The multilayer blow-molded board, as recited in claim 16, wherein the first outer bent wall of the upper layer board bends downward and the second outer bent wall of the lower layer board bends downward such that the first inner layer of the outer bent wall is fused with the second inner layer of the inner bent wall at a bottom of the multilayer blow-molded board.

* * * * *